April 25, 1950 F. G. FOX Re. 23,221

NONSKID TIRE CHAIN

Original Filed Feb. 14, 1947 2 Sheets-Sheet 1

Inventor
FILBERT G. FOX,

By Parry & Miller
his Attorney

April 25, 1950 F. G. FOX Re. 23,221

NONSKID TIRE CHAIN

Original Filed Feb. 14, 1947 2 Sheets-Sheet 2

Inventor
FILBERT G. FOX,
By Perry & Miller
his Attorney

Reissued Apr. 25, 1950 Re. 23,221

UNITED STATES PATENT OFFICE 23,221

NONSKID TIRE CHAIN

Filbert G. Fox, Doylestown, Pa., assignor to Time Saver Corporation of America, a corporation of Illinois Original No. 2,462,378, dated February 22, 1949, Serial No. 728,613, February 14, 1947. Application for reissue July 1, 1949, Serial No. 102,650

8 Claims. (Cl. 152—213)

Matter enclosed in heavy brackets [ ] appears in the original patent but forms no part of this reissue specification; matter printed in italics indicates the additions made by reissue This invention relates to non-skid tire chains for motor vehicle wheels, and has for one of its principal objects the provision of tire chains that may be quickly and easily applied to modern automobile wheels without jacking up the vehicle. Many drivers, particularly those who travel principally on paved streets or roads, are desirous of driving as long as possible without chains, to avoid unnecessary wear on tires and chains as well as the noises *and vibrations* usually incident to tire chains. When, however, inclement weather conditions necessitate the use of tire chains for safe driving they desire to apply the tire chains quickly at the side of the road or street wherever they happen to be, without jacking up the vehicle or individual wheels thereof, *or rolling the car wheel onto the chains to allow attachment to the tire of the wheel.* My improved tire chain has been designed to meet the demands of such drivers.

Another object of this invention is the arrangement of fastening means for tire chains that will enable quick application of the chains on wheels of automobiles having fenders that overlap a large proportion of the wheels and the central portions of the wheels are not provided with apertures of sufficient area to permit handling of the inner side chains therethrough.

*An auxiliary and more specific object of the invention is the provision of fastening means or attachment for tire chains including a pair of clamps connected by an intermediate length of chain adapted to serve as one of the anti-skid cross members of the tire chain wherein the clamps assure that the tire chain remains in position on the tire should this anti-skid cross member connecting them become accidentally broken in use.*

A further object of this invention is the provision of a tire chain having inner and outer circumferential side chains connected at intervals with anti-skid cross chains, the side chains being of sufficient length to touch the ground when centered over a vehicle wheel resting on the ground, one end of the outer side chain and one end of the inner side chain being provided with enlarged loops or rings and the other end of the inner side chain carrying an extension member of sufficient length to first pass through the ring on the inner side chain, then extend directly across the tire tread to form an additional anti-skid member, and then pass through the ring on the outer side chain, a clamp on the end of such extension member then being secured to a link at or adjacent the other end of the outer side chain when the tire chain is drawn into position upon the tire by pulling on such extension member and the end portions of the outer side chain.

A further object of this invention is the provision of an effective tire chain that is simple in construction, inexpensive to manufacture and maintain, and adapted to be fastened upon or removed from a modern automobile wheel quickly by the average driver without the use of tools.

Other objects and advantages will be apparent from the following description, wherein reference is made to the accompanying drawings showing, by way of example, a preferred embodiment of the invention, and wherein Fig. 1 is a perspective view of a vehicle wheel with my improved tire chain centered thereover preparatory to being secured thereupon;

Figure 4:
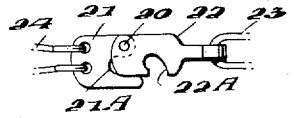
Fig. 4 is an elevational view similar to Fig. 3, after the completion of the third and final step of securing the tire chain *including my adapters* upon the wheel.

Referring now to the drawings, the numeral 10 designates a strand of chain herein called the outside chain because it is the one that when positioned on the wheel will be furthest removed from the vehicle. It is also referred to herein as the shorter chain because it is not as long as its companion chain 11, being in fact of lesser length than the circumference of the wheel tire and adapted when in use to be positioned adjacent to the inner periphery of the tire, as best shown in Fig. 4. The terminal link 12 at one end of the shorter chain 10 is preferably in the form of a loop or ring sufficiently oversized to permit easy passage therethrough of a portion of the companion chain 11, as will be hereinafter described. It will be understood that the terminal link 12 may take various shapes provided loop portions of sufficient area are included in their formation. The inside chain 11 is adapted to be positioned in use adjacent the inner periphery of the wheel tire between the tire and the body of the vehicle. Chain 11 is much longer than its companion chain 10 and longer than the circumference of the tire on which it is used, the extra chain portion being utilized in securing the tire chain on the tire, as hereinafter pointed out. The terminal link 13 on one end of inside chain 11 is formed as an enlarged loop or ring, similar to the enlarged terminal link 12 on chain 10. On the other end of chain 11, however, is provided a clamp 14 of a size adapted to readily pass through the loops of terminal links 12 and 13.

The side chains 10 and 11 are connected together at intervals by anti-skid cross members 15, formed of chain links or other suitable tractive material. Preferably the anti-skid cross members 15 are each secured at its ends to links in side chains 10 and 11 substantially equi-distant from the enlarged ringed ends of chain 11 and of chain 10, and are provided in sufficient number to extend at substantially equal distances from each other throughout the entire length of the shorter side chain 10.

Figure 1:
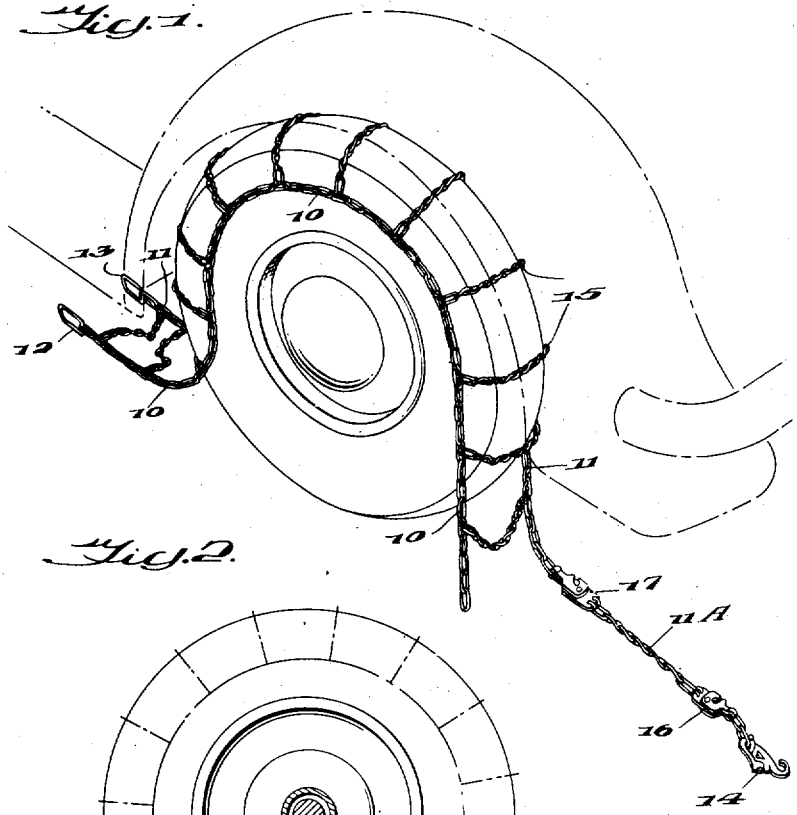

As best shown in Fig. 1, side chain 11 has a long free portion 11A to which no anti-skid members are connected, and this free portion 11A is used to secure the tire chain upon a wheel tire, by first extending along the inside of the tire to and passing through the terminal ring 13 of the inside chain 11 to complete the annular positioning of such inside chain beside the tire (Fig. 2), and then passing directly across the tire to and through the adjacent terminal ring 12 of the outside chain 10 (Fig. 3), and finally extending along the outer side of the tire to the other end of the outside chain, to a link of which it is secured by its terminal clamp 14 (Fig. 4). Where it extends across the tire, the free portion 11A of chain 11 serves as an additional anti-skid member, substantially parallel with the spaced anti-skid cross members 15, and the length of the free portion 11A is preferably just sufficient to leave approximately the same amount of slack in its anti-skid cross portion as prevails in the anti-skid cross members 15 when the terminal clamp 14 is engaged so as to complete the desired substantially annular positioning of outside chain 10 beside the tire. This provides a comparatively loose, easily secured tire chain adapted for quick mounting upon a wheel tire in inclement weather, and which will maintain an increased traction between the tire and road surface as long as desired.

It is preferred to have the inside chain comprised of substantially the same number of links as the outside chain, when both are positioned for use, and eliminate possible slippage of the free portion 11A through terminal links 12 or 13 to slightly unbalance the annular portions of the side chains. For this purpose, an additional pair of clamps are carried in the free portion 11A of the longer side chain, one, as 16, being spaced from the terminal clamp 14 by an appropriate number of links so that, when the clamp 16 is engaged over the terminal ring 12 of outside chain 10 (Fig. 4), such outside chain is comprised of substantially the same number of links as the inside chain 11 when the third clamp, as 17, is engaged over its terminal ring 13. (Fig. 2.) *Thus the clamps 16 and 17 eliminate possible slippage of the free portion 11A through terminal links 12 and 13 and in addition assure that the tire chain remains on the tire even though the free portion 11A which serves as an additional anti-skid cross member becomes broken in use.*

Figure 2:
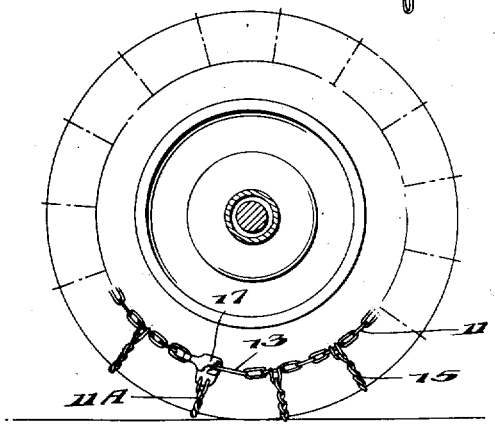
Fig. 2 is an elevational view of the inside face of the wheel, with the inner side chain of my tire chain in annulus form after completion of the first step of securing the tire chain onto the wheel.
Figure 3:
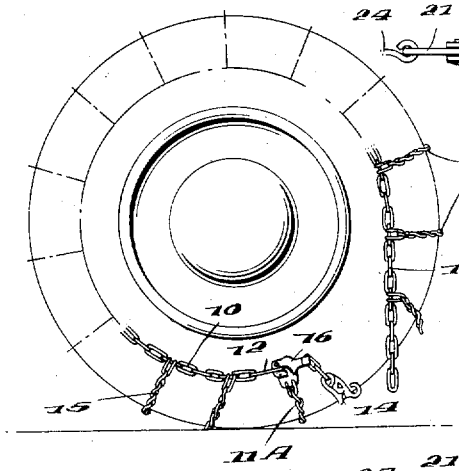
Fig. 3 is an elevational view of the outside face of the wheel, after the completion of the second step of securing the tire chain upon the wheel.

To apply the tire chain upon a wheel tire resting upon the road, the tire chain is substantially centered over the wheel with the free portion 11A of the inside chain resting upon the road aft of the wheel, and one or more of the anti-skid cross members 15 contacting the road in front of the wheel. (Note Fig. 1). The free portion 11A is then pulled forwardly and threaded through the terminal ring 13 of the inside chain, which is simultaneously pulled rearwardly, the pulling being continued until clamp 17 engages over such terminal ring 13, as shown in Fig. 2. This tautens the inner chain 11 and positions it as a substantial annulus beside the tire. If desired, a suitable instrument, such as a hooked rod, may be used to draw ring 13 rearwardly to facilitate positioning of clamp 17 therein. The free portion 11A is then brought directly under and across the tire, preferably as close to the road as can conveniently be done, and clamp 16 then engaged over the terminal ring 12 of the outside chain 10, as shown in Fig. 3. The remaining end portion of extension 11A is then pulled rearwardly and the rearward end portion of the outside chain 10 swung forwardly until the terminal clamp 14 engages over a suitable link of the outside chain to complete the outer annulus. (Fig. 4.)

Figure 5:
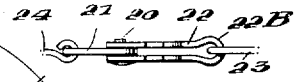
Fig. 5 is a plan view of a clamp preferably used in my improved tire chain; and, Fig. 6 is a side elevation of such clamp.
Figure 6:
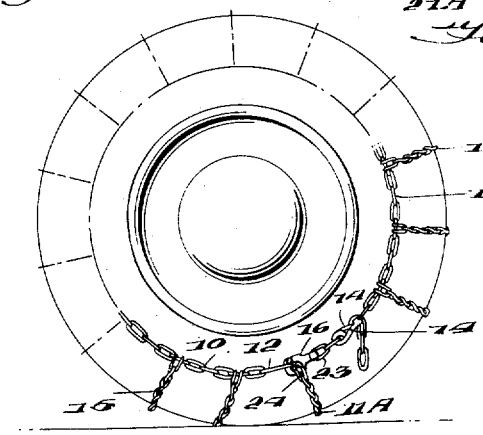

It is believed to be obvious that many forms of clamps could be used as part of my improved tire chain. The conventional form of terminal clamp now in almost universal use may serve as my terminal clamp 14. For the intermediate clamps 16 and 17, however, I prefer the clamp shown in Figs. 5 and 6, whereby portions of extension 11A of inner chain 11 may readily be swung to positions at right angles to adjacent portions of such extension 11A. As best shown in Figs. 5 and 6, clamp 16 is formed of two members pivotally connected to each other by pivot pin 20, one member 21 being in sheet form and the other member 22 bifurcated to straddle member 21. The members are provided with curved slots 21A and 22A respectively, which, as shown in Fig. 6, are separated when extension 11A is maintained in substantially straight line position, but which cooperate in clamping a link, as 12, when one of said members 21 or 22 is swung through 90°, as shown in Fig. 4. The end walls of slots 21A and 22A serve to hold terminal link or ring 12 firmly until one of the clamp members 21 or 22 is reversely swung to effect its release. The right angle bends in extension 11A obtained by use of these clamps are helpful in quickly mounting my improved tire chain upon the tire as well as maintaining the cross-chain portion of extension 11A in position for use.

Many ways of securing clamp members 21 and 22 in the chain are available. As herein shown, a chain link 23 is secured over bend 22B in clamp member 22, and half-link 24 is secured at its ends through spaced apertures in clamp member 21.

While I have illustrated and described a preferred embodiment of my invention, it is to be understood that many variations and modifications may be made within the spirit and scope of the subjoined claims.

I claim:

1. An anti-skid tire chain for easy mounting upon the tire of a vehicle wheel comprising a side chain, an enlarged ring carried at one end of said chain, a chain of greater length than said side chain and having an enlarged ring secured at its end adjacent said first mentioned ring and a clamp secured at its other end, a plurality of spaced anti-skid cross members connecting links of said chains at substantially equal distances from said rings to adjacent the other end of said side chain, the remaining free portion of the longer chain having one portion thereof adapted to pass along one side of a tire and be connected to said ring on the longer chain, an intermediate portion thereof adapted to pass across the tire and be connected to said ring on the side chain to form an additional anti-skid member substantially parallel to the first-named anti-skid cross members, and an end portion adapted to pass along a side of the tire and be connected to the other end portion of said side chain by said end clamp.

2. An anti-skid tire chain for easy mounting upon the tire of a vehicle wheel comprising a side chain, an enlarged ring carried at one end of said chain, a chain of greater length than said side chain and having an enlarged ring secured at its end adjacent said first mentioned ring and a clamp secured at its other end, a plurality of spaced anti-skid cross members connecting links of said chains at substantially equal distances from said rings to adjacent the other end of said side chain, a pair of clamps carried by the remaining free portion of said longer chain and spaced from said end clamp, one of said pair of clamps being adapted to be connected to said ring of the longer chain, the other of said pair of clamps being adapted to be connected to said ring of said side chain, and the end clamp being adapted to be connected to the opposite end of said side chain to thereby secure the tire chain on a tire with the portion between the said pair of clamps positioned across the tire to form an additional anti-skid member substantially parallel to the first named anti-skid cross members.

*3. Means for converting a tire chain of the type having parallel side chains and a plurality of anti-skid cross members connected to links of the side chains at substantially equal distances from one end thereof into a readily mountable anti-skid chain of said type having an inner side chain of substantially greater length than the outer side chain and provided with a clamp on one end thereof, comprising a pair of enlarged ring members each connected to one of the adjacent ends of said inner and outer side chains substantially equidistant from an endmost cross member, a pair of clamps connected in said inner side chain adjacent the end opposite said enlarged ring members and in spaced relation to said first mentioned clamp so that the extended end portion of the longer inner side chain may be passed along the inside of a tire and be connected to said ring in the opposite end of said inner side chain by one of said pair of clamps, then passed across the tire and connected to the enlarged ring on the outer side chain by the other of said pair of clamps to form an additional anti-skid cross member substantially parallel to the first named anti-skid members, and then passed along the outside of the tire to be connected to the opposite end portion of the outer side chain by said end clamp.*

*4. In a tire chain of the type having substantially parallel inner and outer side chains of substantially equal length, a plurality of anti-skid cross members connected to the links of the side chains at substantially equal intervals and end links connected to adjacent ends of the chains respectively; the combination with said chain of a pair of clamps connected to opposite ends of a length of chain substantially equal in length to one of said cross members, one of said pair of clamps being connectable to said inner side chain at an end thereof opposite said end links to form a free end portion of said inner chain extending substantially beyond an adjacent cross member, said one clamp being adapted to be locked to said end link on the opposite end of the inner side chain, and said extended end portion being then passable across said tire to be connected by the other of said pair of clamps to the end link on the adjacent end of the outer side chain.*

*5. Means for converting a tire chain of the type having parallel side chains, a plurality of anti-skid cross members connected to links of the side chains at substantially equal distances from one end thereof, and end links connected to adjacent ends of the chains into a readily mountable anti-skid chain of said type having an inner side chain of substantially greater length than the outer side chain and provided with a clamp on the end thereof opposite said end links, comprising a pair of clamps connected in said inner side chain adjacent the end opposite said end links and in spaced relation to each other and to said first mentioned clamp so that the extended end portion of the longer inner side chain may be passed along the inside of a tire and be connected and locked to the end link in the opposite end of said inner side chain by one of said pair of clamps, then passed across the tire and connected and locked to the end link on the outer side chain by the other of said pair of clamps to form an additional anti-skid cross member substantially parallel to the first named anti-skid members, and then passed along the outside of the tire to be connected to the opposite end portion of the outer side chain by said end clamp, the said clamps locked to the respective end links assuring that the tire chain remains in position on the tire in case the additional anti-skid cross member breaks.*

*6. In a tire chain of the type having substantially parallel inner and outer side chains of substantially equal length, a plurality of anti-skid cross members connected to the links of the side chains at substantially equal intervals and end links connected to adjacent ends of the chains, the combination with said chain of an attachment comprising securing means connectable to the end of said inner side chain opposite said end link and including a pair of clamps, said securing means forming an extension of said inner side chain which may be passed along the inside of a tire and connected to the end link in the opposite end of said inner side chain by one of said pair of clamps, then passed across the tire and connected to the end link in the outer side chain by the other of said pair of clamps to form an additional anti-skid cross member substantially parallel to the first named anti-skid members, and then passed along the outside of the tire to be connected to the opposite end portion of the outer chain.*

*7. The method of forming a tire chain of the type having an inner side chain of greater length than the outer side chain from a tire chain having inner and outer side chains of substantially equal length connected by anti-skid cross members comprising providing enlarged ring members each on one of the adjacent ends of said inner and outer side chains, connecting a pair of interconnected ring-engaging clamps to said inner side chain adjacent the end opposite said*

*enlarged ring members in spaced relation to each other and with the ring-engaging portions thereof facing in opposite directions to form the extended portion of the longer inner side chain that may be passed along the inside of the tire and connected to said ring member on the opposite end of said inner side chain by one of said ring-engaging clamps, then passed across the tire and connected to the enlarged ring member on the outer side chain by the other of said pair of ring-engaging clamps to form an additional anti-skid cross member substantially parallel to the first named anti-skid members and then connected to the end of the outer side chain opposite said enlarged ring members.*

*8. The method of forming a tire chain of the type having an inner side chain of greater length than the outer side chain and provided with a clamp at one end thereof from a tire chain having inner and outer side chains of substantially equal length connected by anti-skid cross members comprising providing enlarged ring members each on one of the adjacent ends of said inner and outer side chains, connecting a pair of interconnected ring-engaging clamps in said inner side chain adjacent the end opposite said enlarged ring members and in spaced relation*

*to each other and to said first mentioned end clamp and with the ring-engaging portions thereof facing in opposite directions to form the extended portion of the longer inner side chain that may be passed along the inside of the tire and connected to said ring member on the opposite end of said inner side chain by one of said ring-engaging clamps, then passed across the tire and connected to the enlarged ring member on the outer side chain by the other of said pair of ring-engaging clamps to form an additional anti-skid cross member substantially parallel to the first named anti-skid members, and then passed along the outside of the tire to be connected to the opposite end portion of the outer side chain by said end clamp.*

FILBERT G. FOX.

REFERENCES CITED

The following references are of record in the file of this patent or the original patent:

UNITED STATES PATENTS

| Number | Name | Date |
|---|---|---|
| 755,970 | Welles | Mar. 29, 1904 |
| 2,074,616 | Martel | Mar. 23, 1937 |
| 2,130,293 | Bonforte | Sept. 13, 1938 |